United States Patent [19]

Yoshido et al.

[11] Patent Number: 5,132,245

[45] Date of Patent: * Jul. 21, 1992

[54] METHOD FOR PRODUCTION OF CUBIC BORON NITRIDE-CONTAINING HIGH-DENSITY INORGANIC COMPOSITE SINTERED ARTICLE

[75] Inventors: Haruo Yoshido, Nagoya; Shoichi Kume, Tsushima; Kazutaka Suzuki; Michihide Machida, both of Ngoya, all of Japan

[73] Assignees: Agency of Industrial Science & Technology; Ministry of International Trade & Industry, both of Tokyo, Japan

[*] Notice: The portion of the term of this patent subsequent to Aug. 27, 2008 has been disclaimed.

[21] Appl. No.: 691,402

[22] Filed: Apr. 25, 1991

Related U.S. Application Data

[63] Continuation-in-part of Ser. No. 436,624, Nov. 15, 1989, Pat. No. 5,043,304.

[30] Foreign Application Priority Data

May 17, 1989 [JP] Japan .................. 1-125502

[51] Int. Cl.⁵ ........................... C04B 35/58
[52] U.S. Cl. ..................... 501/96; 501/102; 501/103; 501/126; 501/127; 501/153; 501/154; 264/65

[58] Field of Search .......... 501/96, 102, 103, 126, 501/127, 153, 154; 264/65

[56] References Cited

U.S. PATENT DOCUMENTS 4,587,225  5/1986  Tsukuma et al. .............. 501/127
5,043,304  8/1991  Yoshida et al. ................ 501/96

FOREIGN PATENT DOCUMENTS 55-104977  9/1980  Japan ........................... 501/96
58-060679  4/1983  Japan ........................... 501/96

*Primary Examiner*—William R. Dixon, Jr.
*Assistant Examiner*—Anthony J. Green
*Attorney, Agent, or Firm*—Oblon, Spivak, McClelland, Maier & Neustadt

[57] ABSTRACT

A cubic boron nitride-containing high-density inorganic composite is prepared by mixing cubic boron nitride with a powdered inorganic compound capable of forming a rigid sintered article having a density of at least 85% and a Vickers hardness of at least 800, which does not promote the conversion of cubic boron nitride into graphite-type phase boron nitride (hBN). The powder mixture is compressed into a mold, and fired at low pressure of between 1,000–2,000 MPa, at a temperature of not more than 1,500° C., under which conditions the cubic boron nitride does not convert to hBN, but is sufficiently metastable to permit the formation of the high-density inorganic composite.

10 Claims, 1 Drawing Sheet

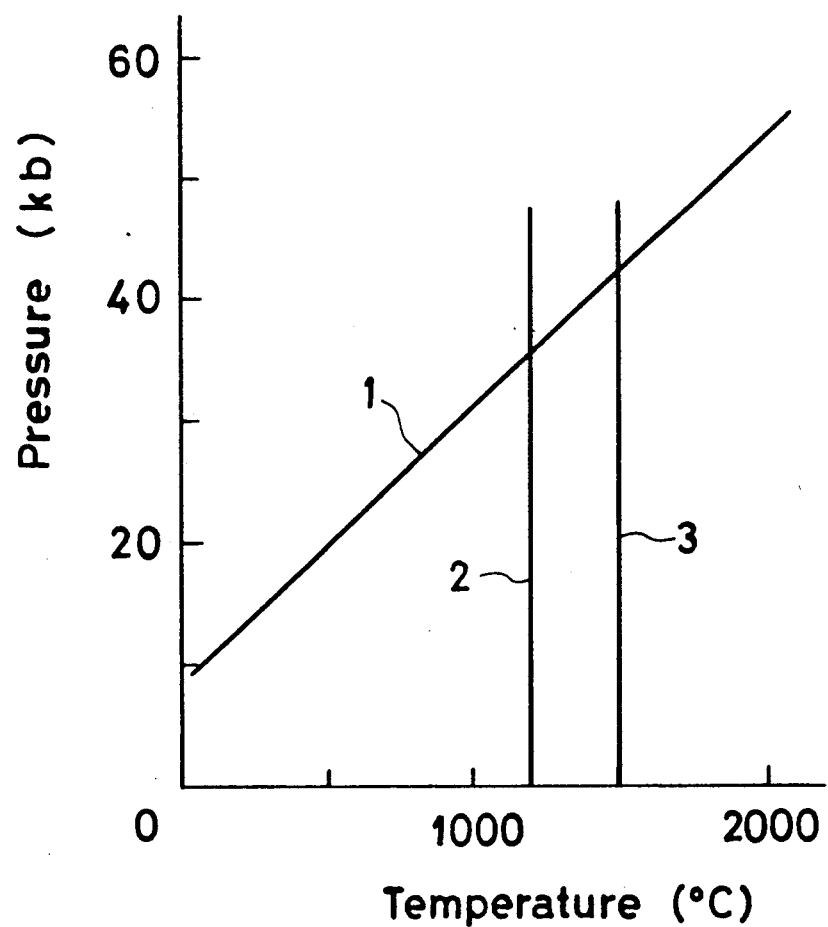

METHOD FOR PRODUCTION OF CUBIC BORON NITRIDE-CONTAINING HIGH-DENSITY INORGANIC COMPOSITE SINTERED ARTICLE

This is a continuation-in-part application of U.S. patent application No. 07/436,624, filed Nov. 15, 1989, allowed U.S. Pat. No. 5,043,304. The entire disclosure thereof is incorporated herein by reference.

BACKGROUND OF THE INVENTION

1. Field of the Invention

This invention relates to a method for the production of a cubic boron nitride-containing high density inorganic composite sintered article possessing a compact texture and a high hardness. The sintered articles produced by the method of this invention are used as high-rigidity wearproof materials such as, for example, cutting tools and wire drawing dies.

2. Prior Art Statement

Heretofore, cubic boron nitride-containing ceramic sintered articles have been produced by the following method.

Specifically, this production is effected by mixing cubic boron nitride with an inorganic substance and keeping the resultant mixture under an extremely high pressure at an elevated temperature such that the cubic boron nitride will not undergo conversion into a graphite-type phase (hexagonal boron nitride; hBN) an will retain thermodynamic stability sufficient for the sintered article to acquire a compact texture.

The drawing is a phase diagram of boron nitride. In the graph, the area overlying the line 1 represents the thermodynamically stable region for cubic boron nitride and the area underlying the line 1 that for graphite-type boron nitride.

The cubic boron nitride as disclosed in Japanese Patent Public Disclosure SHO 63(1988)-35456, for example, is sintered under a pressure of at least 40 kb at a temperature of at least 1,200° C. These sintering conditions are very harsh and cannot be attained unless a girdle type or belt type ultra-high pressure device is used.

For this reason, the cubic boron nitride containing high-density composite sintered article (hereinafter referred to as "cBN sintered article") is not amenable to easy mass production, entails a high cost of production, and is incapable of being produced in large size.

Wakatsuki et al. conducted an experiment on cubic boron nitride under an ultra-high pressure. They reported that when the cubic boron nitride (hereinafter referred to as "cBN") is in a substantially metastable state though not in a thermodynamically stable state, it remains virtually stably because the time which the cBN requires for being converted into the graphite-type phase state is extremely long and that the highest temperature permitting the retention of this substantially stable state falls o the line 2 shown in the drawing [Wakatsuki, Ichise, Aoki and Maeda: "Program and Abstracts of the 14th High Pressure Conference of Japan", (1972) page 78]. Their observation indicates that even under the conditions of a low pressure and a high temperature falling in the area underlying the thermodynamic equilibrium line 1 of cBN shown in the drawing, the cubic boron nitride exists virtually stably so long as the temperature does not surpass the line 2, for example, is not higher than 1,200° C.

The aforementioned report by Wakatsuki et al. is based on an experiment conducted on cBN only by the use of an ultra-high pressure device. This experiment has demonstrated that the cBN continues to exist without being converted into a graphite-type phase even when it is treated in its virtually metastable state though not in its thermodynamically stable state.

It has been found that the treatment of the kind performed by Wakatsuki et al. does not necessarily require use of the so-called ultra-high pressure device.

In the production of the cBN sintered article with the inorganic compound and the cBN, therefore, application of a pressure effective in promoting the compaction of the inorganic compound enables production of a sintered article having a highly compacted texture.

An object of this invention is to provide a method for the production of a high-rigidity compact cBN sintered article in a substantially metastable, though not thermodynamically stable, region of cBN.

The parent U.S. application Ser. No. 07/436,624 partially meets this object by disclosing and claiming a process related to that disclosed and claimed herein, but wherein pressures are limited to "less than 2,000 MPa, exemplified by conditions under 1,000 MPa. This application address the provision of a process varying pressure above 1,000 MPa and below 2,000 MPa.

SUMMARY OF THE INVENTION

To accomplish the object described above according to this invention, there is provided a method for the production of a cubic boron nitride-containing high-density inorganic composite sintered article, essentially consisting of preparing (A) a mixture of (a) 1% to 90% by volume of a cubic boron nitride powder with (b) 99% to 10% by volume of an inorganic compound a') capable of forming a high-rigidity sintered article possessing a density of at least 85% and a Vickers hardness of at least 800 and b') incapable of promoting the conversion of the cubic boron nitride into a graphite-type phase under the conditions of between 1,000-2,000 MPa (as used herein, "between 1,000-2,000 MPa" is exclusive of the endpoint of that range, that is, more than 1,000 MPa and less than 2,000 MPa) of pressure and not more than 1,500° C. of temperature for permitting the cubic boron nitride to remain in a substantially metastable, though not thermodynamically stable, state or a shaped article obtained, when necessary, by compressing the mixture in a mold of a prescribed shape or (B) cubic boron nitride particles coated with 1% to 300% by volume, based on the amount of the cubic boron nitride, of an inorganic compound a') capable of forming a high-rigidity sintered article possessing a density of at least 85% and a Vickers hardness of at least 800 and b') incapable of promoting the conversion of the cubic boron nitride into a graphite-type phase under the conditions of between 1,000–2,000 MPa of pressure and not more than 1,500° C. of temperature for permitting the cubic boron nitride to remain in a substantially metastable, though not thermodynamically stable, state or a shaped article obtained, when necessary, by compressing the composite in a mold of a prescribed shape, and firing the mixture or shaped article (A) or the particles or shaped article of (B) under the conditions of between 1,000–2,000 MPa of pressure and not more than ,500° C. of temperature for permitting the cubic boron nitride to remain in a substantially metastable, though not thermodynamically stable, state for a period in the range in which the cBN undergoes no conversion into a graphite-type phase.

The case in which the cBN in the form of (A) mentioned above is further coated with the inorganic substance is embraced by the present invention.

BRIEF DESCRIPTION OF THE DRAWINGS

The drawing is a phase diagram of boron nitride.

DESCRIPTION OF THE PREFERRED EMBODIMENTS

In working the method described above under the ordinary conditions, a hot isostatic press (HIP) device is advantageously used. Under the condition of a pressure of not less than 1,500 MPa and less than 2,000 MPa, however, a very high pressure device should be used.

The hot isostatic pressure is a device for sintering a given object at an elevated temperature under isotropic application of pressure, with an inert gas for example serving as a pressure transmitting medium.

In this case, the mixture of the cBN with the inorganic compound to be subjected to the simultaneous application of heat and pressure is placed in a capsule capable of transmitting the HIP pressure and the capsule, hermetically sealed after displacement of the entrapped air, is disposed within the HIP.

Now, the cBN to be used in the present invention will be described in detail below.

The CBN powder is a synthetic product.

When the cBN is a product of synthesis using a catalyst, the catalyst must be removed from the product of synthesis to prevent the conversion of the cBN into a graphite-type phase. The particle size of the cBN has only to be such a to fit the use for which the sintered product is intended.

The inorganic compound which is mixed with the cBN for forming the cBN sintered article is such that when it is sintered by itself in an HIP device or a very high pressure device, for example, under the conditions of between 1,000-2,000 MPa of pressure and not more than 1,500° C. of temperature, preferably the conditions falling in the region permitting the cBN to remain in a substantially metastable state, it will produce a compact high-rigidity sintered article exhibiting a density of not less than 85% and a Vickers hardness of not less than 800. Further, this inorganic compound must be incapable of promoting the conversion of the cBN into a graphite-type phase. As the inorganic compound fulfilling this requirement, there is used at least one member selected from the class consisting of oxides, nitrides, carbides, carbonitrides and oxynitrides of Ti, Zr, Hf, V, Nb, Ta, Cr, Mo, W, Si, B and Al.

Particularly, alumina, an oxide of aluminum, can form a finely divided raw material exhibiting high purity and a good sintering property. For example, the alumina which is produced by the ammonium-aluminum carbonate thermal decomposition process as disclosed in Japanese Patent Public Disclosure SHO 63(1988)-151616 is preferable because it forms a compact texture at a temperature on the order of 1,400° C. under ordinary sintering conditions of normal pressure. Further, in the case of the finely divided alumina powder of high purity having mixed therewith up to 10% by volume of magnesia (MgO) and/or titania ($TiO_x$, $x=1 \sim 2$) which is effective in promoting the sintering of alumina, high-purity alumina other than the alumina disclosed in Japanese Patent Public Disclosure SHO 63(1988)-151616 mentioned above, e.g. a high-purity readily sintering alumina produced by the Bayer process, the organic aluminum hydrolyzing decomposition process, the ammonium-alum thermal decomposition process, the ethylene chlorohydrin process, or the submerged sparkle discharging process, composed of minute particles not exceeding 1 μm, and possessed of a purity of not less than 99% may be used.

Otherwise, the oxide of zirconium, preferably the readily sintering yttria-added partially stabilized zirconia ($2 \sim 4$ mol % $Y_2O_3$-$ZrO_2$) powder produced by the coprecipitation process or the alumina-zirconia type powder (FC Report 1 [5] (1983) 13-17) and the titania powder ($TiO_2$: Program and Abstracts of the 15th High Pressure Conference of Japan, (1973) page 174) may be used.

As a nitride of titanium, the titan nitride (TiN: Yamada et al., Journal of the Ceramic Society of Japan, 89. (1981) 621-625) may be used.

For the purpose of enhancing the sintering property of the mixture of the cBN with the inorganic compound, the surface of the cBN may be coated with 0.1% to 500% by volume, based on the amount of cBN, of at least one member selected from the class consisting of (a) Ti, Zr, Hf, V, Nb, Ta, Cr, Mo W, Si, B and Al and (b) oxides, nitrides, carbides, carbonitrides, and oxynitrides of Ti, Zr, Hf, V, Nb, Ta, Cr, Mo, W, Si, B and Al by the PVD process, the CVD process, or the plating process, or the disproportionation reaction process.

The conditions for permitting the cBN to remain in a substantially metastable, though not thermodynamically stable, state are those underlying the line 1 in the graph of the drawing and not exceeding 1,500° C. In other words, the cBN remains substantially stable up to 1,500° C. (line 3 in the same graph), a temperature much higher than the temperature 1,200° C. reported by Wakatsuki et al. When the temperature exceeds 1,500° C., however, the cBN is rapidly converted to a graphite-type phase. The expression "metastable region of cBN" as used in the present invention refers to the region of low pressure and low temperature enclosed by the line 1 and the line 3 in the graph of the drawing.

The upper limit of the sintering temperature, therefore, is 1,500° C. When the sintering temperature is set in the neighborhood of 1,500° C., it becomes necessary to control the sintering temperature rigidly. Preferably, the pressure is in the range of 1,000-2,000 MPa, which can be generated by the existing HIP device or such a very high pressure device as a piston-cylinder type pressure device, and the temperature is in the range of 500° C. to 1,400° C.

The present invention also embraces the cBN particles coated with 1% to 300% by volume, based on the amount of cBN particles, of the inorganic compound and the method for sintering the coated cBN under entirely the same conditions as described above.

When the sintering is effected by the use of a HIP device, it is advantageously carried out by the capsule process which requires the mixture to be disposed in a capsule capable of transmitting the HIP pressure and then requires the capsule to be hermetically sealed after displacement of the entrapped air. The capsule is desired to be such that it will be suitably softened at the sintering temperature and will effectively transmit the HIP pressure. The materials which are usable for the capsule fulfilling this requirement include such glass materials as Pyrex and Vycor and such metallic materials as Pt, Mo, Fe, Fe alloys, Ni and Ni alloys, for example.

Since the capsule made of such a material as mentioned above reacts with the cBN or the inorganic compound, generally hexagonal boron nitride (hBN) powder is interposed between them for the purpose of precluding this reliction.

This invention practically concerns production of the cBN sintered article by the use of a HIP device or a very high pressure device. It has originated in the inventors' new knowledge that the upper limit of the sintering temperature is 1,500° C., that the effective use of the inorganic compound within the range of working temperature is attained under specific conditions of temperature and pressure, and that this sintering is attained sufficiently in a substantially metastable state without requiring application of the pressure which is otherwise required when the cBN assumes a thermodynamically stable state.

This invention permits the cBN-containing high density inorganic composite sintered article which has heretofore been produced by a treatment in the thermodynamically stable region of cBN, i.e. under the conditions of extremely high pressure and high temperature to be obtained by a treatment to be carried out under moderate conditions sufficient for retention of the cBN in a substantially metastable, though not thermodynamically stable, state.

Now, the method of this invention for the production of a cubic boron nitride-containing high density inorganic composite sintered article will be described below with reference to working examples.

EXAMPLE 1

With a ball mill made of alumina, a synthetic cBN powder having a maximum particle diameter of 1 μm and a high-purity (99.99%) readily sintering alumina powder having an average diameter of 0.2 μm and produced by the ammonium-aluminum carbonate thermal decomposition process were mixed in a ratio of 10:90 by volume in acetone for two hours. Thereafter, the resultant mixture was dried in a vacuum of $10^{-6}$ torr at 200° C.

Then, the dried powder was compressed in the shape of a disk 16 mm in diameter and 5 mm in thickness. The shaped article was disposed in a capsule of Pyrex glass filled with an hBN powder and the capsule was evacuated under $10^{-6}$ torr at 400° C. for 12 hours and then hermetically sealed.

The capsule was disposed in a HIP device using argon gas as a pressure transmitting medium and sintered therein at a temperature of 1,200° C. under a pressure of 1,050 MPa for a period of 3 hours.

Thereafter, the device was cooled and relieved of pressure and the sintered article was removed from the device.

The sintered article had a density of 99.0% and a Vickers microhardness of 2,720 under a load of 500 g after 10 seconds' testing time. The mixing ratio of raw materials, the sintering conditions and the physical properties of the sintered article were as shown in Table 1.

EXAMPLES 2 to 4

Sintered articles were produced by following the procedure of Example 1, except that the ratio of the cBN powder to the alumina powder in volume was varied as shown in Table 1. They were tested for physical properties. The conditions and the results of the test were as shown in Table 1.

EXAMPLE 5

With a ball mill made of alumina, a synthetic cBN powder having a maximum particle diameter of 1 μm and at high-purity (99.99%) readily sintering alumina powder having ah average diameter of 0.2 μm and produced by the ammonium-aluminum carbonate thermal decomposition process were mixed in a ratio of 10:90 by volume in acetone for two hours. Thereafter, the resultant mixture was dried in a vacuum of $10^{-6}$ torr, at 200° C.

Then, the dried powder was compressed in the shape of a cylinder 10 mm in diameter and 8 mm in height. The shaped article was disposed in a high pressure cell assembly of pyrophyllite incorporating hBN therein so that the shaped article was enclosed by the hBN, and the high pressure cell assembly was disposed in a piston-cylinder type very high pressure device (a PC device), held therein while increasing the internal pressure to 1,500 MPa at room temperature and then elevating the internal temperature to 1,200° C., and left standing for a period of 3 hours.

Thereafter, the device was cooled and relieved of pressure and the sintered article was removed from the device.

The mixing ratio of raw materials, the sintering conditions and the physical properties of the sintered article were as shown in Table 1.

EXAMPLES 6 TO 14 AND COMPARATIVE EXPERIMENT 1

Sintered articles were produced by following the procedure of Example 5, except that the ratio of the cBN powder to the alumina powder in volume and the sintering conditions were varied as shown in Table 1. They were tested for physical properties. The results of the test were as shown in Table 1.

It was clearly understood from Table 1 that the sintered article obtained in Comparative Experiment 1 was inferior in density and hardness to the sintered articles obtained in Examples 1 to 14.

EXAMPLES 15 TO 28

Sintered articles were produced by following the procedure of Example 1, except that high-purity (not less than 99%) readily sintering alumina powder produced by the Bayer process in the form of minute particles having a diameter of not more than 1 μm and incorporating therein MgO and $TiO_x$ (wherein x=1 to 2) as a sintering auxiliary were used as inorganic compounds. The conditions of production and the results of test for physical properties were as shown in Table 2.

COMPARATIVE EXPERIMENT 2

A sintered article was produced with the ratio of the cBN powder to the alumina powder and the sintering conditions set as shown in Table 2. They were tested for physical properties. The results of the test were as shown in Table 2.

It was clearly understood from Table 2 that the sintered article obtained in Comparative Experiment 2 was inferior in density and hardness to the sintered articles obtained in Examples 5 to 28.

The powder X-ray diffraction patterns obtained of the sintered articles of Examples 1, 5, 15 and 19 to determine the crystal phases of the articles showed no discernible diffraction peak other than the peaks of cBN and lumina.

EXAMPLES 29 TO 42 AND COMPARATIVE EXPERIMENT 3

Sintered articles were produced by substantially following the procedure of Example 1, except that a readily sintering yttria-added partially stabilized zirconia (3 mol % $Y_2O_3$-$ZrO_2$) powder (PSZ) produced by the coprecipitation process was used in place of alumina. The volume ratio of cBN to PSZ and the sintering conditions of the HIP and PC devices were varied as shown in Table 3. The physical properties of the produced sintered articles were also shown in Table 3.

It was clearly understood from Table 3 that the sintered article obtained in Comparative Experiment 3 was inferior in density and hardness to the sintered articles obtained in Examples 29 to 42.

TABLE 1

|  | No. | Mixing ratio cBN (vol %) | Mixing ratio Alumina (vol %) | Sintering conditions Pressure (MPa) | Sintering conditions Temp. (°C.) | Sintering conditions Time (hr) | Sintered article Relative density (%) | Sintered article Hardness (Hv) | Device used |
|---|---|---|---|---|---|---|---|---|---|
| Example | 1 | 10 | 90 | 1050 | 1200 | 3 | 99.0 | 2720 | HIP |
|  | 2 | 30 | 70 | " | " | " | 98.1 | 3000 |  |
|  | 3 | 50 | 50 | " | " | " | 94.8 | 3190 |  |
|  | 4 | 60 | 40 | " | " | " | 92.2 | 2980 |  |
|  | 5 | 10 | 90 | 1500 | 1200 | 3 | 99.2 | 2740 | PC |
|  | 6 | 30 | 70 | " | " | " | 98.4 | 3100 |  |
|  | 7 | 50 | 50 | " | " | " | 96.3 | 3260 |  |
|  | 8 | 60 | 40 | " | " | " | 95.3 | 3310 |  |
|  | 9 | 65 | 35 | " | 1400 | 0.5 | 95.8 | 3400 |  |
|  | 10 | 10 | 90 | 1800 | 1200 | 3 | 99.5 | 2770 |  |
|  | 11 | 30 | 70 | " | " | " | 98.9 | 3150 |  |
|  | 12 | 50 | 50 | " | " | " | 98.2 | 3380 |  |
|  | 13 | 60 | 40 | " | " | " | 97.5 | 3500 |  |
|  | 14 | 65 | 35 | " | 1300 | " | 97.8 | 3530 |  |
| Comparative Experiment | 1 | 95 | 5 | 1800 | 1300 | 3 | 83.7 | 890 |  |

TABLE 2

|  | No. | Mixing ratio cBN (vol %) | Mixing ratio Alumina (vol %) | Mixing ratio MgO (vol %) | $TiO_x$ (x = 1~2) | Sintering conditions Pressure (MPa) | Sintering conditions Temp. (°C.) | Sintering conditions Time (hr) | Sintered article Relative density (%) | Sintered article Hardness (Hv) | Device used |
|---|---|---|---|---|---|---|---|---|---|---|---|
| Example | 15 | 10 | 87.3 | 1.1 | 1.6 | 1050 | 1200 | 3 | 99.3 | 2960 | HIP |
|  | 16 | 30 | 67.3 | 1.1 | 1.6 | " | " | " | 99.0 | 3320 |  |
|  | 17 | 50 | 48.4 | 0.6 | 1.0 | " | " | " | 98.4 | 3830 |  |
|  | 18 | 60 | 38.4 | 0.6 | 1.0 | " | " | " | 96.2 | 3800 |  |
|  | 19 | 10 | 87.3 | 1.1 | 1.6 | 1500 | 1200 | 3 | 99.5 | 2980 | PC |
|  | 20 | 30 | 67.3 | 1.1 | 1.6 | " | " | " | 99.3 | 3350 |  |
|  | 21 | 50 | 48.4 | 0.6 | 1.0 | " | " | " | 98.7 | 3860 |  |
|  | 22 | 60 | 38.4 | 0.6 | 1.0 | " | " | " | 97.5 | 3900 |  |
|  | 23 | 65 | 33.4 | 0.6 | 1.0 | " | 1400 | 0.5 | 98.2 | 4010 |  |
|  | 24 | 10 | 87.3 | 1.1 | 1.6 | 1800 | 1200 | 3 | 99.7 | 3000 |  |
|  | 25 | 30 | 67.3 | 1.1 | 1.6 | " | " | " | 99.5 | 3370 |  |
|  | 26 | 50 | 48.4 | 0.6 | 1.0 | " | " | " | 99.0 | 3880 |  |
|  | 27 | 60 | 38.4 | 0.6 | 1.0 | " | " | " | 97.9 | 3930 |  |
|  | 28 | 65 | 33.4 | 0.6 | 1.0 | " | 1300 | " | 98.1 | 3990 |  |
| Comparative Experiment | 2 | 95 | 4.85 | 0.05 | 0.1 | 1800 | 1300 | 3 | 84.8 | 920 |  |

TABLE 3

|  | No. | Mixing ratio cBN (vol %) | Mixing ratio PSZ (vol %) | Sintering conditions Pressure (MPa) | Sintering conditions Temp. (°C.) | Sintering conditions Time (hr) | Sintered article Relative density (%) | Sintered article Hardness (Hv) | Device used |
|---|---|---|---|---|---|---|---|---|---|
| Example | 29 | 10 | 90 | 1050 | 1200 | 3 | 99.8 | 1530 | HIP |
|  | 30 | 30 | 70 | " | " | " | 99.4 | 1900 |  |
|  | 31 | 50 | 50 | " | " | " | 98.6 | 2100 |  |
|  | 32 | 60 | 40 | " | " | " | 96.6 | 2120 |  |
|  | 33 | 10 | 90 | 1500 | 1200 | 3 | 99.8 | 1530 | PC |
|  | 34 | 30 | 70 | " | " | " | 99.4 | 1910 |  |
|  | 35 | 50 | 50 | " | " | " | 99.0 | 2150 |  |
|  | 36 | 60 | 40 | " | " | " | 97.8 | 2240 |  |
|  | 37 | 65 | 35 | " | 1400 | 0.5 | 98.7 | 2300 |  |
|  | 38 | 10 | 90 | 1800 | 1200 | 3 | 99.9 | 1540 |  |
|  | 39 | 30 | 70 | " | " | " | 99.6 | 1930 |  |
|  | 40 | 50 | 50 | " | " | " | 99.1 | 2200 |  |
|  | 41 | 60 | 40 | " | " | " | 98.3 | 2280 |  |
|  | 42 | 65 | 35 | " | 1300 | " | 98.5 | 2290 |  |
| Comparative Experiment | 3 | 95 | 5 | 1800 | 1300 | 3 | 85.1 | 860 |  |

What is claimed as new and desired to be secured by Letters Patent of the United States is:

1. A method for the production of a cubic boron nitride-containing high-density inorganic composite sintered article, comprising the steps of:

preparing a mixture of 1% to 90% by volume of powder of cubic boron nitride with 99% to 10% by volume of an inorganic compound capable of forming a high-rigidity sintered article possessing a density of at least 85% and a Vickers hardness of at least 800 and incapable of promoting the conversion of said cubic boron nitride into a graphite-type phase (hBN) under the conditions of between 1,000-2,000 MPa of pressure and not more than 1,500° C. of temperature for permitting said cubic boron nitride to remain in a substantially metastable, though not thermodynamically stable, state;

compressing said mixture in a mold of a prescribed shape; and firing said mixture under the conditions of a pressure in the range of more than 1,000 MPa to less than 2,000 MPa and a temperature of not more than 1,500° C. for permitting said cubic boron nitride to remain in a substantially metastable, though not thermodynamically stable state for a period in the range in which said cubic boron nitride undergoes no conversion into a hBN phase.

2. A method according to claim 1, wherein the step of firing is chosen from the group consisting of hot isostatic pressing and very high pressure hot pressing.

3. A method according to claim 1, wherein said inorganic compound is at least one member selected from the group consisting of oxides, nitrides, carbides, carbonitrides and oxynitrides of Ti, Zr, Hf, V, Nb, Ta, Cr, Mo, W, Si, B and Al.

4. A method according to claim 3, wherein said inorganic compound is alumina powder.

5. A method according to claim 4, wherein said alumina powder contains not more than 10% by weight of at least one member selected from the group consisting of MgO and $TiO_x$ (wherein x = 1 to 2).

6. A method according to claim 4, wherein the primary particles of said alumina powder have a maximum diameter of 1 $\mu$m.

7. A method according to claim 3, wherein said inorganic compound is zirconia powder.

8. A method according to claim 7, wherein said zirconia powder is a partially stabilized zirconia powder.

9. A method according to claim 7, wherein said zirconia powder is produced by the coprecipitation process and the primary particles thereof have a maximum diameter of 1 $\mu$m.

10. A method according to claim 1, wherein said powder of cubic boron nitride is coated with 0.1% to 500% by volume, based on the amount of said powder, of at least one member selected from the group consisting of (a) Ti, Zr, Hf, V, Nb, Ta, Cr, Mo, W, Si, B and Al and (b) oxides, nitrides, carbides, carbonitrides and oxynitrides of Ti, Zr, Hf, V, Nb, Ta, Cr, Mo, W, Si, B and Al.

* * * * *